United States Patent Office 3,381,521
Patented May 7, 1968

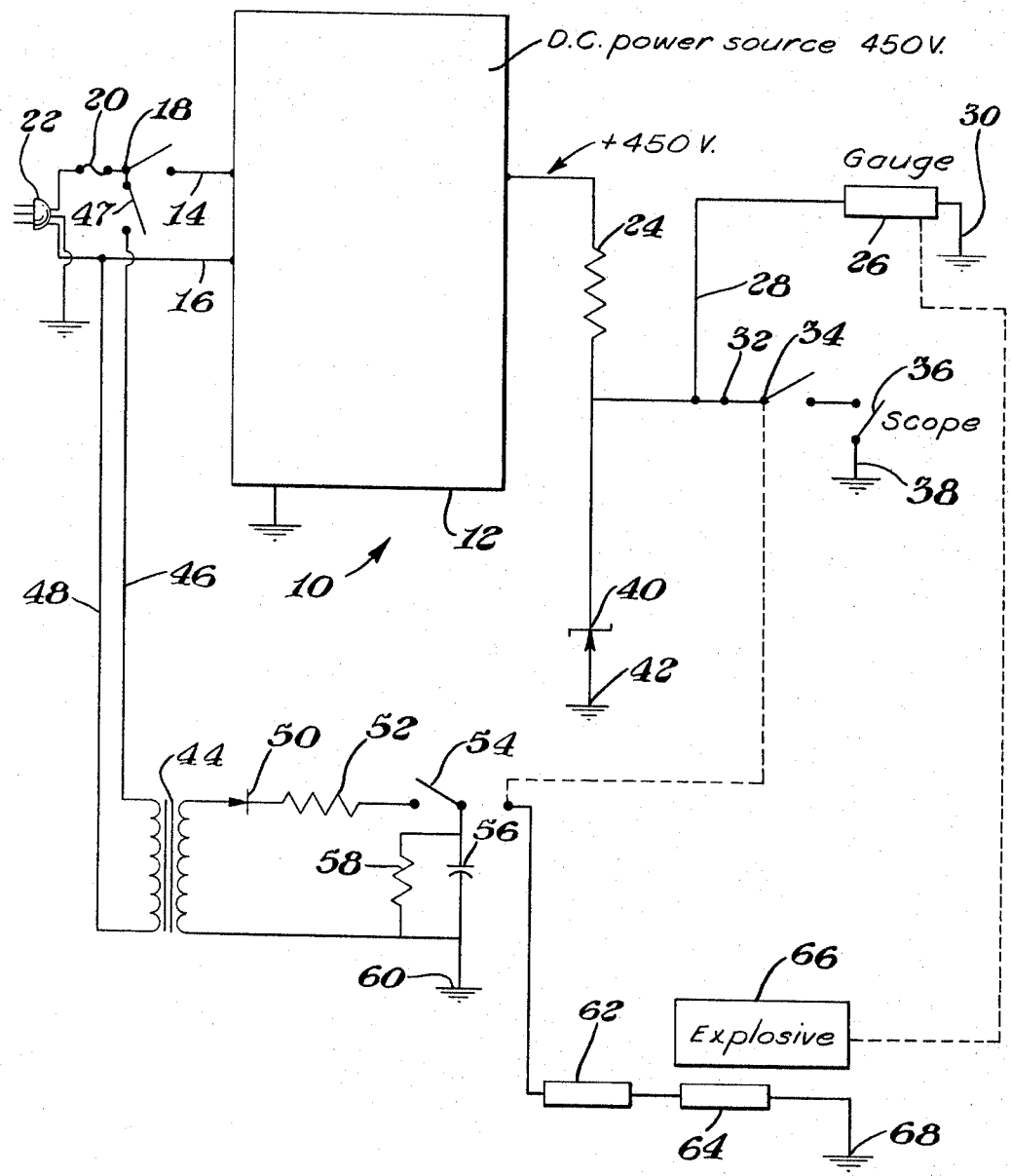

3,381,521
DETONATION GAUGE APPARATUS
Victor J. Caldecourt, Lyle W. Colburn, and Thomas E. Slykhouse, Midland, Mich., assignors to The Dow Chemical Company, Midland, Mich., a corporation of Delaware
Filed Aug. 3, 1965, Ser. No. 476,863
5 Claims. (Cl. 73—35)

This invention relates to detonation velocity determination apparatus, and particularly to power equipment for use with such apparatus.

It is important in the testing and development of explosives to have reliable and accurate means to measure the detonation velocity of such explosives.

A detonation velocity gauge is usually used in making such test. One such gauge comprises a helical wound resistive element wound on a spirally grooved plastic rod which is encased in a metal tube. The grooves in the plastic rod must be deep enough so that the resistive element will not contact the metal tube. This complete assembly is attached to a two conductor wire cable with one lead attached to the resistive element and the other lead attached to the metal tube. It is then inserted in an explosive mixture and the two lead conductors attached to the detonation velocity gauge power supply.

When the explosive is detonated, the pressure collapses the end of the metal tube at the point of detonation so as to make contact with the resistive element, thus completing the circuit. Then, as the detonation progresses the pressure continues to collapse the metal tube thereby decreasing the resistance of the resistive element. A constant voltage source in the power supply is applied to the detonation velocity gauge. A measure of the voltage change across the resistive element versus time is recorded on an oscilloscope. A photograph is made of this oscilloscope trace. In this way, a continuous detonation velocity can be measured over the entire length of an explosive charge.

The resistance of the gauge will vary from open circuit before detonation, to maximum resistance of the resistive element when the metal tube collapses initially on the resistive element, to a short circuit when the two lead conductors are shorted.

In the use of such equipment, however, false signals sometimes occur because the power supply which fires the detonating cap may become coupled to the detonation gauge circuit during the course of the explosion.

Occasionally, too, the oscilloscope used to record the progress of a detonation initially would be overloaded by the spurious signal, and the delay in stabilizing the input circuit of the oscilloscope after the overloading would mask out or greatly distort the test results.

Also, prior art means for field use in measuring detonation velocity have not always given the desired degree of accuracy in results even when used properly.

Accordingly, a principal object of this invention is to provide improved, reliable detonation velocity measurement apparatus.

Another object of this invention is to provide improved detonation velocity measurement apparatus which is free of spurious signals.

A different object of this invention is to provide improved, detonation velocity measurement apparatus yielding improved accuracy of results.

In accordance with this invention a constant voltage power supply having an output of a few hundred volts is coupled to a detonation velocity gauge through a series resistor whose value is very large compared to the value of the resistance of the detonation gauge. A Zener diode is coupled between the detonation gauge and ground (across the scope input, in practice) to limit the maximum voltage applied to the oscilloscope which is also coupled across the detonation gauge by lead means.

The spurious electrical signals appearing on the oscilloscope trace are eliminated by using two electrically fired dynamite caps connected in series. One cap must be a delay cap and the other an instantaneous cap. The instantaneous cap is used to sever the firing line between the charge and the power source used to fire the cap thus eliminating the source of external electrical energy from the power supply to the explosive charge. The delay cap then detonates the explosive charge.

The detonation velocity gauge power supply and the power supply for detonating the electric cap are combined into one integrated unit.

A ganged switch is used to detonate the charge and to couple the scope across the detonation gauge.

The invention, as well as additional objects and advantages thereof, will best be understood when the following detailed description is read in connection with the accompanying drawing.

In the drawing, detonation velocity measuring apparatus, indicated generally by the numeral 10, includes a constant voltage direct current power source 12 having an output of, for example, 450 volts. The output of the power supply is applied through series resistor 24 and lead 28 across the detonation gauge 26 to a ground 30. A Zener diode 40 is coupled between the input end of the detonation gauge 26 and a ground connection 42. An oscilloscope 36 is coupled between ground 38 and the input to the gauge 26 through a single pole double throw switch 34 whose input and common poles are shorted together.

The input to the power supply is coupled through leads 14, 16, switch 18, and fuse 20 to a suitable plug 22 which may be applied to an A.C. energization source (not shown).

Power for detonating the explosive whose detonation velocity is to be tested is provided by an A.C. power supply composed of a transformer 44 whose primary is coupled by means of leads 46, 48 and switch 47 across the plug 22.

The secondary of the transformer 44 is coupled to ground 60 on one side and to a series connected rectifier diode 50, filter resistor 52, and the input contact of a single pole double throw switch 54.

The center contact of the switch 54 is coupled to a capacitor 56 and bleeder resistor 48 connected in parallel to a ground 60.

The output contact of the switch 54 is coupled between series connected detonator caps 62, 64 and a ground 68. The explosive 66 to be detonated is disposed adjacent to or surrounds the cap 64, which is a delayed action type detonating cap.

The movable contact element of the switches 34 and 54 are ganged together so that the oscilloscope 36 is coupled across the detonation gauge 26 as the detonators 62, 64 are fired.

In operation with the switches 18, 47 closed, switch 54 coupled to the power supply as represented by the reistor 52 and switch 34 coupled only to lead 32, about 450 volts is applied across the resistor 24 and the Zener diode 40 to ground. The Zener diode restricts the voltage drop across itself to 6.8 volts.

The detonation gauge 26 is not a complete circuit until the explosive 66 is detonated, crushing the end of the metal tube of the gauge to make contact with the resistance coil in the gauge. Because of this, the switch 34, if closed to couple the scope (not shown) to the circuit, would have 450 volts applied across it if the Zener diode 40 were not in the circuit. The application of such a high voltage would, of course, completely overload the input to the scope.

The capacitator 56 is charged by the secondary circuit of the transformer 44 and kept charged until the switch 54 is moved to its other position to fire the detonators 62, 64. The discharge of the capacitor 56 through the detonators to ground fires the detonators, with the detonator 62 firing first. The so-called instantaneous cap severs the firing line between the explosive charge and the capacitor 56 and remote from the circuit to the detonation gauge 26, thus preventing power from the detonator firing circuit from being coupled to the detonation gauge circuit.

In prior art detonation velocity measuring systems, for example, voltage from the firing circuit often was applied to the detonation gauge circuit as a result of the partial stripping of insulation from the wires of the respective circuits. The use of the instantaneous type detonator 62, by severing the firing line before it becomes adjacent to the detonation gauge line, prevents spurious readings on the scope or overloading of the scope input circuit.

Thus, when the delayed detonator 64 fires, the detonation progressively crushes the detonation gauge along its length, changing it from an initial resistance on first being crushed, to a low value (close to zero) as the detonation causes the entire length of the gauge to be crushed to short out the entire resistance winding thereon.

Because the value of the resistance 24 is 15,000 ohms, or 100 times the resistance (150 ohms) of the detonation gauge, the current through the detonation gauge 26 remains substantially constant as the resistance of the gauge changes during the detonation. Thus, with a relatively constant current passing through the resistance in the detonation gauge, changes in the potential measured across that resistance are due substantially entirely to changes in resistance of the gauge as the detonation progresses.

Another advantage of the use of the delayed action detonator to detonate the explosive is that it eliminates error caused by what is termed contact bounce. Such bouncing, which occurs when the switch coupling the scope input to the detonation gauge is closed, occurs for less than 1 millisecond, usually. However, when the high rate of propagation of an explosion is considered, such times become appreciable when shown on the scope screen. Thus, assuring that the explosion occurs after the scope input circuits are stabilized assures that another cause of erroneous signals is eliminated.

What is claimed is:
1. Detonation velocity measuring apparatus comprising:
  (a) a constant voltage power supply delivering a few hundred volts to its ouput;
  (B) a resistance element and a detonation gauge having as resistor, said resistance element and detonation gauge being connected in series across the output of said power supply;
  (C) a Zener diode, said diode being coupled across said detonation gauge;
  (D) means including a switch and coupling line for coupling the input of an oscilloscope across said detonation gauge; and
  (E) a firing circuit including a voltage source and a switch, firing line and two detonators connected in series across said voltage source, one of said detonators being of the so-called instantaneous type and the other of said detonators being of the so-called delayed action type, said delayed action detonator being adapted to be disposed in operative relationship with respect to an explosive element and said instantaneous detonator being disposed to said firing line remote from said coupling line whereby said firing line is severed after said firing line is energized and before said explosive is detonated, said switch in said firing circuit and said switch in said means for coupling the input of the oscilloscope across the detonation gauge being ganged.

2. Apparatus in accordance with claim 1, wherein said detonation gauge is connected between ground and said resistance element.

3. Apparatus in accordance with claim 1, wherein the resistance of the resistance element is about 100 times the resistance of said resistor in the detonation gauge.

4. Apparatus in accordance with claim 1, wherein said voltage source includes a capacitor adapted to be coupled across said detonators.

5. Apparatus in accordance with claim 1, wherein said coupling line and said firing line are adjacent to each other near said explosive element.

References Cited
UNITED STATES PATENTS 3,027,751  4/1962  Jones _____ 73—35

JAMES J. GILL, *Primary Examiner.*